United States Patent
Hsu et al.

(10) Patent No.: US 11,171,330 B2
(45) Date of Patent: Nov. 9, 2021

(54) BATTERY CELL WITH INCREASED TAB AREA AND METHOD AND APPARATUS FOR MANUFACTURING SAME

(71) Applicant: GM GLOBAL TECHNOLOGY OPERATIONS LLC, Detroit, MI (US)

(72) Inventors: Chih-Cheng Hsu, Bloomfield Township, MI (US); Sherman H. Zeng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 16/529,112

(22) Filed: Aug. 1, 2019

(65) Prior Publication Data

US 2019/0355987 A1 Nov. 21, 2019

Related U.S. Application Data

(62) Division of application No. 15/651,354, filed on Jul. 17, 2017, now Pat. No. 10,431,816.

(51) Int. Cl.

| | |
|---|---|
| *H01M 4/36* | (2006.01) |
| *H01M 4/70* | (2006.01) |
| *H01M 2/26* | (2006.01) |
| *H01M 10/0525* | (2010.01) |
| *H01M 4/13* | (2010.01) |

(Continued)

(52) U.S. Cl.
CPC ............ *H01M 4/366* (2013.01); *B60L 50/64* (2019.02); *B60L 53/24* (2019.02); *H01M 4/0404* (2013.01); *H01M 4/13* (2013.01); *H01M 4/139* (2013.01); *H01M 4/667* (2013.01); *H01M 4/70* (2013.01); *H01M 10/0525* (2013.01); *H01M 10/46* (2013.01); *H01M 50/531* (2021.01);

(Continued)

(58) Field of Classification Search
CPC ...... H01M 4/70; H01M 10/04; H01M 4/0404; H01M 4/139; H01M 4/667
See application file for complete search history.

(56) References Cited

U.S. PATENT DOCUMENTS

| | | |
|---|---|---|
| 5,578,397 A | 11/1996 | Verhoog et al. |
| 9,455,448 B1 | 9/2016 | Talamine et al. |

(Continued)

FOREIGN PATENT DOCUMENTS

| | | |
|---|---|---|
| CN | 1444304 A | 9/2003 |
| CN | 203574062 U | 4/2014 |

(Continued)

*Primary Examiner* — Imran Akram
(74) *Attorney, Agent, or Firm* — Quinn IP Law

(57) ABSTRACT

A method of forming batteries includes feeding a foil through a coating machine. The movement of the foil defines a foil direction. The method applies a first coating band and a second coating band to the foil. The second coating band is spaced from the first coating band by a first tab gap. The foil is cut substantially perpendicular to the foil direction to separate a first coated blank. The first coated blank is cut separate the first coating band and a first portion of the first tab gap, and to separate the second coating band and a second portion of the first tab gap. A first electrode is formed from the first coating band and the first portion of the first tab gap, and a second electrode is formed from the second coating band and the second portion of the first tab gap.

16 Claims, 4 Drawing Sheets

(51) Int. Cl.
*B60L 50/64* (2019.01)
*H01M 10/46* (2006.01)
*H01M 4/04* (2006.01)
*H01M 4/139* (2010.01)
*H02J 7/14* (2006.01)
*H01M 4/66* (2006.01)
*B60L 53/24* (2019.01)
*H01M 50/531* (2021.01)

(52) U.S. Cl.
CPC ............... *H02J 7/14* (2013.01); *H01M 4/661* (2013.01); *H01M 4/662* (2013.01)

(56) References Cited

U.S. PATENT DOCUMENTS

| | | |
|---|---|---|
| 2009/0169990 A1 | 7/2009 | Gardner et al. |
| 2009/0305120 A1 | 12/2009 | Blomgren et al. |
| 2010/0081052 A1 | 4/2010 | Morishima et al. |
| 2011/0293996 A1 * | 12/2011 | Daidoji ................ H01M 4/70 |
| | | 429/158 |
| 2012/0177981 A1 | 7/2012 | Kim |
| 2013/0149579 A1 | 6/2013 | Park |
| 2013/0164585 A1 | 6/2013 | Kwak et al. |
| 2014/0120397 A1 | 5/2014 | Kim et al. |
| 2016/0064714 A1 | 3/2016 | Okuda et al. |
| 2016/0126583 A1 | 5/2016 | Kato et al. |
| 2016/0172666 A1 * | 6/2016 | Shimizu ............... H01M 4/661 |
| | | 429/152 |
| 2016/0322626 A1 | 11/2016 | Okuda et al. |
| 2017/0207438 A1 | 7/2017 | Zhu et al. |
| 2018/0123184 A1 * | 5/2018 | Shen .................... H01G 11/22 |
| 2018/0277816 A1 * | 9/2018 | Minagata .......... H01M 10/0404 |

FOREIGN PATENT DOCUMENTS

| | | | |
|---|---|---|---|
| CN | 204885269 U | 12/2015 | |
| KR | 1020080030698 A | 4/2008 | |
| WO | WO-2017072898 A1 * | 5/2017 | ......... H01M 50/531 |

* cited by examiner

BATTERY CELL WITH INCREASED TAB AREA AND METHOD AND APPARATUS FOR MANUFACTURING SAME

CROSS-REFERENCE TO RELATED APPLICATIONS

This application is a divisional of application Ser. No. 15/651,354, filed Jul. 17, 2017, which is hereby incorporated by reference in its entirety.

INTRODUCTION

This disclosure generally relates to lithium ion batteries, which are a class of rechargeable batteries in which lithium ions move between a negative electrode (i.e., anode) and a positive electrode (i.e., cathode). Liquid and polymer electrolytes can facilitate the movement of lithium ions between the anode and cathode.

SUMMARY

A lithium ion battery cell or module is provided. A plurality of the lithium ion battery modules or mono cells may be incorporated into a battery pack. The battery pack may be used with a powertrain. A first mono cell includes a first electrode foil having a first body and a first tab. The first body has long edges defining a length, and short edges defining a width. A ratio of the length to width of the first body is at least two. However, in some configurations, the ratio of the length to width of the first body is at least five.

The first tab extends from one of the long edges of the first body. The first tab is entirely between one of the short edges of the first body and a midpoint of the long edge. A first coating is formed of one of an anode material and a cathode material, and substantially covers at least one side of the first body of the first electrode foil.

A second electrode foil has similar structural features to the first electrode foil. A second coating is formed of the other of the anode material and the cathode material, and substantially covers the second body of the second electrode foil. A second tab extends from one of the long edges of the second body. The second tab of the second electrode foil is oriented opposite the first tab of the first electrode foil.

A tab length of the first tab and the second tab may be at least 45 percent of the length of the first body and the second body, respectively. A tab height of the first tab and the second tab may be at least 20 percent of the width of the first body and the second body, respectively.

A second mono cell includes a third electrode foil and a third coating, and a fourth electrode foil and a fourth coating. The third electrode foil has a third body having long edges defining a length, and short edges defining a width, and a ratio of the length to width is at least five. A third tab extends from one of the long edges, entirely between one of the short edges and a midpoint of the long edge, and has a third tab length of at least 45 percent of the length of the third body. A third coating is formed of one of an anodic material and a cathodic material and substantially covers the third body of the third electrode foil.

The fourth electrode foil has a fourth body with long edges defining a length, and short edges defining a width, and a ratio of the length to width is at least five. A fourth tab extends from one of the long edges, entirely between one of the short edges and a midpoint of the long edge, and has a fourth tab length of at least 45 percent of the length of the fourth body. The fourth tab of the fourth electrode foil is opposite the third tab of the third electrode foil relative to the fourth body. The fourth coating is formed of the other of the anodic material and the cathodic material substantially covering the fourth body of the fourth electrode foil.

The first tab of the first mono cell and the third tab of the second mono cell are on opposing sides of the midpoint of the long edge of the respective first body and third body. Similarly, the second tab of the first mono cell and the fourth tab of the second mono cell are on opposing sides of the midpoint of the long edge of the respective second body and fourth body.

A method, and associated apparatus, for forming battery electrodes are also provided. The method includes feeding a foil, or foil coil, through a coating machine. Movement of the foil defines a foil direction.

A first coating band is applied to the foil, and a second coating band is applied to the foil. The second coating band is spaced from the first coating band by a first tab gap, which is a portion of the foil that is not coated by the coating machine.

The foil is cut substantially perpendicular to the foil direction to separate a first coated blank. The first coated blank is cut or notched to separate the first coating band and a first portion of the first tab gap from the second coating band and a second portion of the first tab gap. Therefore, a first electrode is formed from the first coating band and the first portion of the first tab gap, and a second electrode is formed from the second coating band and the second portion of the first tab gap.

The above features and advantages, and other features and advantages, of the present subject matter are readily apparent from the following detailed description of some of the best modes and other configurations for carrying out the disclosed structures, methods, or both.

DETAILED DESCRIPTION

Figure 1:
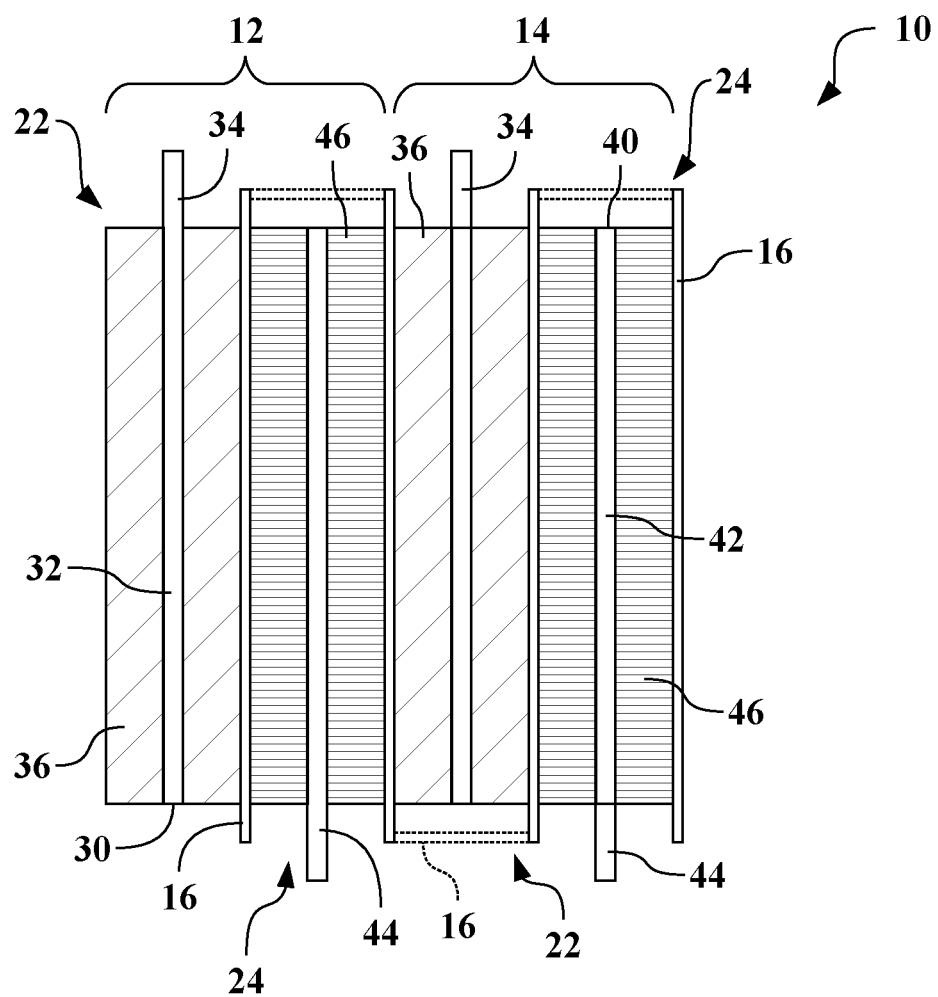
FIG. 1 is a schematic side view of a portion of a battery or battery cell, illustrating first and second mono cells formed from first and second electrodes.

In the drawings, like reference numbers correspond to like or similar components whenever possible throughout the several figures. There is shown in FIG. 1 a schematic, diagrammatic view of a portion of a battery cell or a battery module 10, which may be a lithium ion battery or a portion of a lithium ion battery.

The portion of the battery module 10 shown in FIG. 1 has two lithium ion battery mono cells, a first mono cell 12 and a second mono cell 14. Note that the battery module 10 likely includes many additional mono cells. Portions of the first mono cell 12 and the second mono cell 14 are insulated by one or more separators 16, which may be planar or may be a Z-type separator 16, as illustrated by the dashed portions of the separators 16.

As used herein, the term "mono cell" refers to the most basic unit of the lithium ion battery, which has two electrodes and is capable of operating as a battery. In some situation, the term "cell" may also be used to refer to the basic unit, or may be used to refer to a number of mono cells, particularly when the mono cells are connected by a common positive bus structure and a common negative bus structure, in parallel. In such a situation, multiple cells may be assembled, in series or parallel, to form a module. Therefore, in some situations, the term cell may be used as either an equivalent to the use of mono cell, herein, or as an intermediate unit between mono cell and module. However, as used herein, the term "module" is used to refer to a plurality of operatively-connected mono cells, such that FIG. 1 illustrates a module by having more than one mono cell. Generally, the term "pack" refers to a plurality of operatively-connected modules.

Much of the description herein refers to lithium ion battery components. However, the structures, methods, and apparatuses described herein may be applied to other battery chemistry types.

The structures of FIG. 1 are basic illustrations, and the portion of the battery module 10 illustrated may be part of a larger module. The module, or smaller portions thereof, may be encased or encapsulated in container, which can be a hard (e.g., metallic) case or soft pouch (e.g., multiple layers of polymer, multiple layers of metal sheet, or combinations thereof). Furthermore, the portions of the battery module 10 shown may be surrounded by an electrolyte. Multiple modules may be assembled and operatively connected to form a battery pack, such as may be used in a hybrid or electric vehicle.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

Each of the first mono cell 12 and the second mono cell 14 includes a positive electrode 22 and a negative electrode 24. The positive electrode 22 may be referred to as the cathode and the negative electrode 24 may be referred to as the anode. Either of the electrodes, or portions thereof, may be referred to numerically as, for example, first, second, third, and so on. The positive electrode 22 and the negative electrode 24 are generally formed of foils and intercalation materials, which may be applied to the foils as coatings.

A first electrode foil, which may be referred to as a cathode foil or a positive foil 30, has a first body 32 and a first tab 34. In some configurations, the positive foil 30 may be formed from, for example and without limitation, aluminum or aluminum alloys. A first coating, cathode coating, or positive coating 36 may be formed of a cathodic material and substantially covers the first body 32 of the positive foil 30. As shown in FIG. 1, the positive coating 36 may be applied to both sides of the first body 32, such that electrons may move to and from both sides of the first body 32.

A second electrode foil, which may be referred to as an anode foil or a negative foil 40, has a second body 42 and a second tab 44. In some configurations, the negative foil 40 may be formed from, for example and without limitation, copper or copper alloys. A second coating, anode coating, or negative coating 46 may be formed of an anodic material substantially covering the second body 42 of the negative foil 40. The positive coating 36 and the negative coating 46 are intercalation materials. Note that the positive coating 36 and the negative coating 46 are illustrated in FIG. 1 with hatch marks to better identify the different materials. However, the view of FIG. 1 is not a cross section.

As used herein, the term substantially, refers to relationships that are, ideally perfect or complete, but where manufacturing realties prevent absolute perfection. Therefore, substantially denotes typical variance from perfection. For example, if height A is substantially equal to height B, it would be preferred that the two heights are 100.0% equivalent, but manufacturing realities likely result in the distances varying from such perfection. Skilled artisans would recognize the amount of acceptable variance.

For example, coverages, areas, or distances may generally be within 10% of perfection for substantial equivalence. Similarly, relative alignments, such as parallel or perpendicular, may generally be considered to be within 5%.

Exemplary operation and chemical composition of the battery module 10 is described herein. However, these details are for illustrative purposes only. Skilled artisans will recognize various alternative materials and operating mechanisms, and the descriptions herein are not limiting the configurations explicitly discussed.

The negative electrode 24 may include lithium and the positive electrode 22 may include sulfur. Generally, the positive coating 36 is capable of storing lithium ions at a higher electric potential than the negative coating 46. The positive foil 30 and the negative foil 40 are connected by an interruptible, external, circuit that allows an electric current to pass between the positive electrode 22 and the negative electrode 24 to electrically balance the related migration of lithium ions within the battery module 10. Although FIG. 1 illustrates negative coating 46 and positive coating 36 schematically for the sake of clarity, negative coating 46 and positive coating 36 may be an exclusive interface between the negative electrode 24 and the positive electrode 22, respectively, and the electrolyte.

The negative coating 46 may include, for example and without limitation, any lithium host material configured to sufficiently undergo lithium ion intercalation, deintercalation, and alloying, while functioning as the negative terminal of the battery module 10. The negative coating 46 may also include a polymer binder material to structurally hold the lithium host material together. For example, in one configuration, negative coating 46 may include graphite intermingled in one or more of polyvinyldiene fluoride (PVdF), an ethylene propylene diene monomer (EPDM) rubber, carboxymethoxyl cellulose (CMC), and styrene, 1,3-butadiene polymer (SBR).

Graphite and carbon materials may be used in the negative electrode 24 because it exhibits favorable lithium ion intercalation and deintercalation characteristics, is relatively non-reactive, and able to store lithium ions in quantities that produce a relatively high energy density. Other materials may be also be used to form the negative coating 46, including, for example and without limitation, one or more of lithium titanate, silicon, silicon oxide, tin, and tin oxide.

The negative foil 40 may include, for example and without limitation, copper, aluminum, stainless steel, or another appropriate electrically conductive material, as recognized by skilled artisans. The negative foil 40 may be treated (e.g., coated) with highly electrically conductive materials, including, for example and without limitation, one or more of conductive carbon black, graphite, carbon nanotubes, carbon nanofiber, graphene, and vapor growth carbon fiber (VGCF), among others.

The positive coating 36 may include, for example and without limitation, any lithium-based active material configured to sufficiently undergo lithium intercalation and deintercalation while functioning as the positive terminal of one of the cells of the battery module 10. Positive coating 36 may also include a polymer binder material, an ethylene propylene diene monomer (EPDM) rubber, carboxymethoxyl cellulose (CMC), and styrene, 1,3-butadiene polymer (SBR), to structurally hold the lithium-based active material together.

The positive coating 36 may be formed from layered lithium transitional metal oxides. In some configurations, the positive coating 36, for example and without limitation, one or more of spinel lithium manganese oxide ($LiMn_2O_4$), lithium cobalt oxide ($LiCoO_2$), a nickel-manganese-cobalt oxide [$Li(Ni_xMn_yCo_z)O_2$], or a lithium iron polyanion oxide such as lithium iron phosphate ($LiFePO_4$) or lithium iron fluorophosphate ($Li_2FePO_4F$) intermingled in at least one of polyvinyldiene fluoride (PVdF), an ethylene propylene diene monomer (EPDM) rubber, carboxymethoxyl cellulose (CMC), and styrene, 1,3-butadiene polymer (SBR).

Other lithium-based active materials can also be utilized besides those mention. Alternative materials include, but are not limited to, lithium nickel oxide ($LiNiO_2$), lithium aluminum manganese oxide ($Li_xAl_yMn_{1-y}O_2$), and lithium vanadium oxide ($LiV_2O_5$).

The positive foil 30 may include, for example and without limitation, aluminum or another appropriate electrically conductive material, as would be recognized by skilled artisans. The positive foil 30 may be treated (e.g., coated) with highly electrically conductive materials, including, for example and without limitation, one or more of conductive carbon black, graphite, carbon nanotubes, carbon nanofiber, graphene, and vapor growth carbon fiber (VGCF).

The components shown in the figures may be in contact with an appropriate electrolyte solution configured to conduct lithium ions between the negative electrode 24 and the positive electrode 22 within the battery module 10. In one configuration, the electrolyte solution can be a non-aqueous liquid electrolyte solution that includes, for example and without limitation, a lithium salt dissolved in an organic solvent or a mixture of organic solvents. Illustrative lithium salts that can be dissolved in an organic solvent to form the non-aqueous liquid electrolyte solution include, for example and without limitation: $LiClO_4$, $LiAlCl_4$, LiI, LiBr, LiSCN, $LiBF_4$, $LiB(C_6H_5)_4$ $LiAsF_6$, $LiCF_3SO_3$, $LiN(CF_3SO_2)_2$, $LiPF_6$, and mixtures or combinations thereof. Illustrative organic solvents include, for example and without limitation: cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 16 may be a microporous polymer, including, for example and without limitation, a polyolefin. The polyolefin may be a homopolymer (derived from a single monomer constituent) or a heteropolymer (derived from more than one monomer constituent), either linear or branched. For example, and without limitation, the polyolefin can be polyethylene (PE), polypropylene (PP), or a blend of PE and PP. The separator 16 may, optionally, be ceramic-coated with materials including, for example and without limitation, one or more of ceramic type aluminum oxide (e.g., $Al_2O_3$), and lithiated zeolite-type oxides, among others. Lithiated zeolite-type oxides may be used to enhance the reliability and cycle life performance of lithium ion batteries, such as the battery module 10.

The separator 16 may be a single layer or a multi-layer microporous polymer laminate, fabricated from either a dry or wet process. For example, in one configuration, a single layer of the polyolefin may form the entirety of the separator 16. In another configuration, however, multiple discrete layers of similar or dissimilar polyolefins may be assembled into the separator 16. The separator 16 may also include other polymers in addition to the polyolefin such as, but not limited to, polyethylene terephthalate (PET), polyvinylidene fluoride (PVdF), and or a polyamide (Nylon). The polyolefin layer, and any other optional polymer layers, may further be included in the separator 16 as a fibrous layer to help provide the separator 16 with appropriate structural and porosity characteristics.

The battery module 10 generally operates by reversibly passing lithium ions between the negative electrode 24 and the positive electrode 22. Lithium ions move from the positive electrode 22 to the negative electrode 24 while charging, and move from the negative electrode 24 to the positive electrode 22 while discharging. At the beginning of a discharge, the negative electrode 24 generally contains a high concentration of intercalated lithium ions while the positive electrode 22 is relatively depleted, such that establishing a closed external circuit between the negative electrode 24 and the positive electrode 22 under such circumstances causes intercalated lithium ions to be extracted from the negative electrode 24. The extracted lithium atoms are split into lithium ions and electrons as they leave an intercalation host at an electrode-electrolyte interface.

The lithium ions are carried through the micropores of the separator 16 from the negative electrode 24 to the positive electrode 22 by the ionically conductive electrolyte while, at the same time, the electrons are transmitted through the external circuit from the negative electrode 24 to positive electrode 22 to balance the overall electrochemical cell. Flow of electrons through the external circuit can be harnessed and fed to a load device until the level of intercalated lithium in the negative electrode falls below a workable level or the need for power ceases.

The battery module 10 may be recharged after a partial or full discharge of its available capacity. To charge or re-power the lithium ion cells of the battery module 10, an external power source is connected between the positive electrode 22 and the negative electrode 24 to drive the reverse of the discharge electrochemical reactions. That is, during charging, the external power source extracts the lithium ions present in the positive electrode 22 to produce lithium ions and electrons. The lithium ions are carried back through the separator 16 by the electrolyte solution, and the electrons are driven back through the external circuit, both towards the negative electrode 24. The lithium ions and electrons are ultimately reunited at the negative electrode, thus replenishing it with intercalated lithium for future cell discharge.

The lithium ion battery module 10, or a battery module or pack comprising a plurality of battery cells connected in series and/or in parallel, can be utilized to reversibly supply power and energy to an associated load device. Lithium ion batteries may be used in various electronic devices (e.g., laptop computers, cameras, radios, mine detectors, and cellular/smart phones), aircrafts, and satellites, among others. Lithium ion batteries, modules, and packs may be incorporated into vehicles, such as a hybrid electric vehicle (HEV), a battery electric vehicle (BEV), a plug-in HEV, or an extended-range electric vehicle (EREV) to generate enough power and energy to operate one or more systems of the vehicle. For instance, the battery cells, modules, and packs may be used in combination with a gasoline or diesel internal combustion engine to propel the vehicle (such as in hybrid electric vehicles), or may be used alone to propel the vehicle (such as in battery powered vehicles).

The battery module 10 may be used in any rolling platform, including, without limitation: motorcycles, boats, tractors, buses, motorcycles, mobile homes, campers, and tanks. Furthermore, they components described herein may also be used in a variety of other industries and applications, including, without limitation: aerospace applications, consumer goods, industrial and construction equipment, farm equipment, or heavy machinery.

Figure 2A:
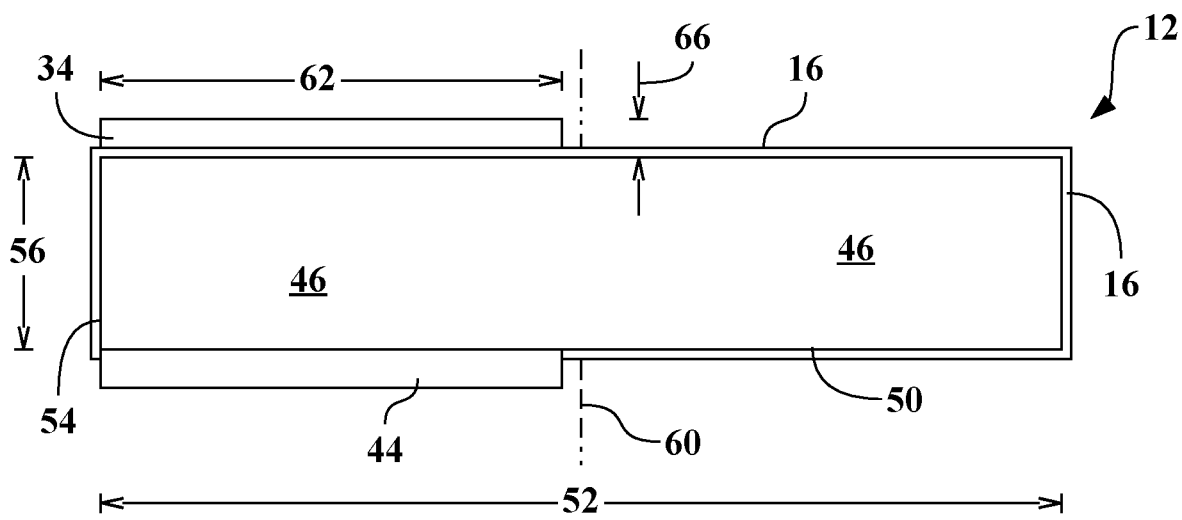
FIG. 2A is a schematic front view of a mono cell, such as the first mono cell shown in FIG. 1.
Figure 2B:
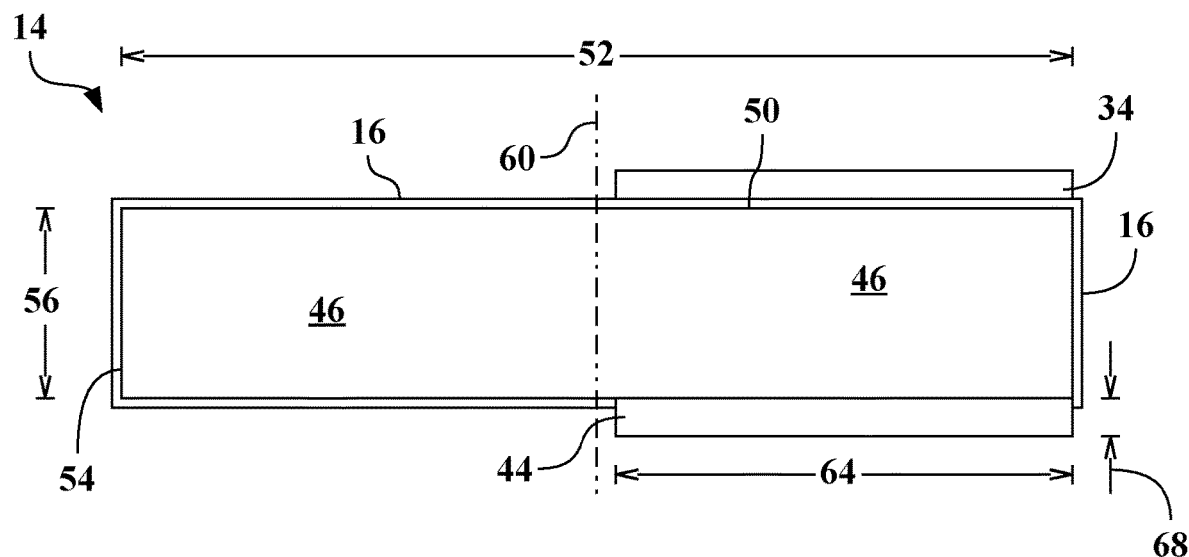
FIG. 2B is a schematic front view of a mono cell, such as the second mono cell shown in FIG. 1.
Figure 2C:
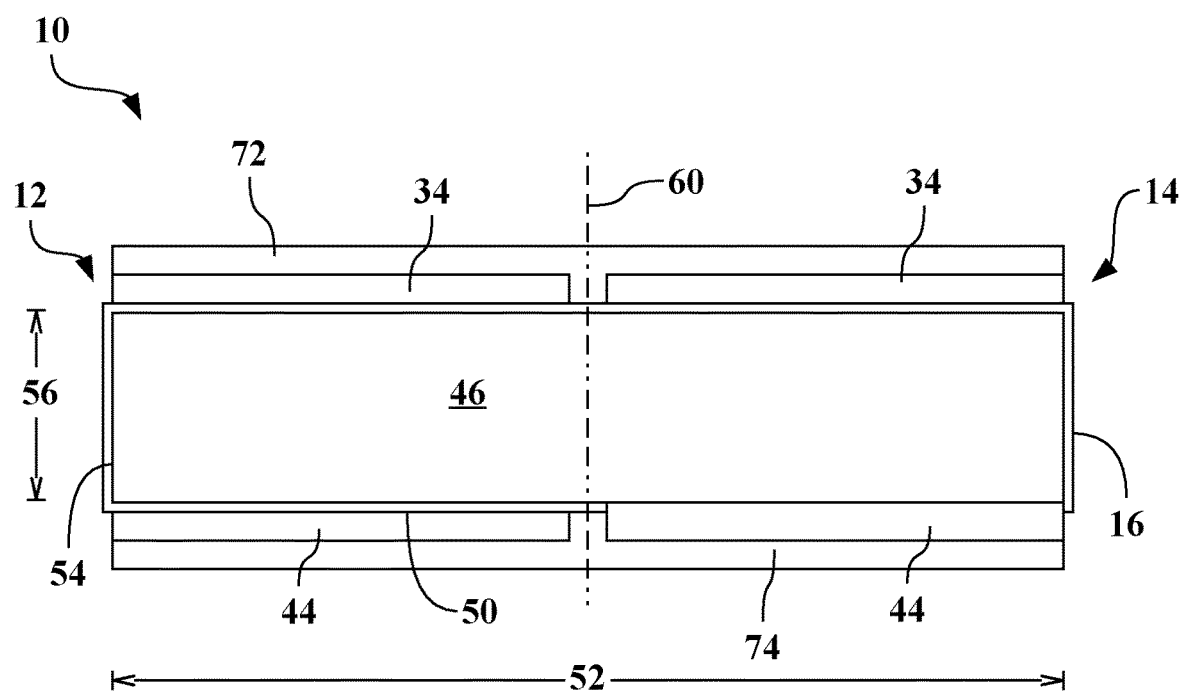
FIG. 2C is a schematic front view of a stack of mono cells, such those shown in FIGS. 2A and 2B, joined by bus bars to form a battery cell that can be connected to a module.

Referring also to FIGS. 2A, 2B, and 2C, and with continued reference to FIG. 1, there are shown additional views of portions of the battery module 10 shown in FIG. 1. FIG. 2A schematically illustrates a side view of the first mono cell 12, and FIG. 2B schematically illustrates a side view of the second mono cell 14. FIG. 2C schematically illustrates a side view of a plurality of mono cells.

FIG. 2A shows a side view of the first mono cell 12, with only the separator 16 between the positive electrode 22 and the negative electrode 24. The first body 32 of the positive foil 30 has long edges 50 defining a length 52 and short edges 54 defining a width 56. Similarly, the second body 42 of the negative foil 40 has long edges 50 defining the length 52 and short edges 54 defining the width 56.

Note that in the view of FIGS. 2A and 2B, the coatings are blocking the bodies from view. In particular, the negative coating 46 is substantially covering the second body 42, such that neither the first body 32 nor the second body 42 is viewable in FIGS. 2A and 2B. However, the long edges 50 and the short edges 54 are substantially coincident with the negative coating 46. Therefore, the length 52 and the width 56 may be measured from the negative coating 46, as it has substantially the same dimension as the second body 42 and the first body 32.

A ratio of the length 52 to the width 56 of the first body 32 and the second body 42 is at least three. However, in many configurations, such as that shown in FIGS. 2A and 2B, the ratio of the length 52 to the width 56 is greater than five. For example, the overall length of the first mono cell 12 and the second mono cell 14 may be approximately 600 millimeters. In such a configuration, the length 52 may be approximately 590 millimeters and the width 56 may be approximately 110 millimeters.

As viewable in FIG. 2A, the first tab 34 extends from one of the long edges 50 of the first body 32. The first tab 34 is entirely between one of the short edges 54 and a midpoint 60 of the long edge 50. Therefore, the first tab 34 is asymmetric about the first body 32.

Similarly, the second tab 44 extends from one of the long edges 50 of the second body 42. The second tab 44 is entirely between one of the short edges 54 and a midpoint 60 of the long edge 50, such that the second tab 44 is also asymmetric about the second body 42. Note that, when assembled into the first mono cell 12, the second tab 44 is on the opposing side of the first mono cell 12 from the first tab 34, relative to the respective coatings and the bodies.

By orienting the first tab 34 and the second tab 44 on the long edges 50, the distance that electrons are required to travel through the positive foil 30 and the negative foil 40, respectively, may be reduced relative to other configurations. For example, other configurations may have tabs extending from the short edges 54, such that electrons may be forced to travel the entire length 52 to reach the first tab 34 of the second tab 44 and be carried into the external circuit.

As viewable in FIG. 2B, the second mono cell 14 has substantially the same features. However, the positive electrode 22 and the negative electrode 24 of the second mono cell 14 are flipped horizontally (as viewed in the figures) relative to the orientation of the first mono cell 12. Note that, in the viewpoint of FIG. 1, the first tab 34 and the second tab 44 of the first mono cell 12 are in the foreground, while the first tab 34 and the second tab 44 of the second mono cell 14 are in the background. Any of the elements of the second mono cell 14 that are designated as first and second may also be referred to as third and fourth.

As described herein, the positive electrode 22 and the negative electrode 24 may be produced in such a manner that they can be placed into any of the orientations shown herein, in spite of the asymmetric nature of the first tab 34 and the second tab 44. This allows shared equipment to produce the positive electrode 22 for either the first mono cell 12 or the second mono cell 14 and to produce the negative electrode 24 for either the first mono cell 12 or the second mono cell 14.

As illustrated in FIGS. 2A and 2B, the first tab 34 defines a first tab length 62, and the second tab 44 defines a second tab length 64. The first tab length 62 may be at least 45 percent of the length 52 of the first body 32, and the second tab length 64 may be at least 45 percent of the length 52 of the second body 42.

The relatively large length of the first tab 34 and the second tab 44 reduces the current density flowing through the first tab 34 and the second tab 44 during operation of the battery module 10. Additionally, as described herein, having the first tab 34 and the second tab 44 at nearly half the size of the length 52 of the respective bodies reduces the amount of waste created by manufacturing the positive electrode 22 and the negative electrode 24.

As illustrated in FIGS. 2A and 2B, a first tab height 66 of the first tab 34 is at least 20 percent of the width 56 of the first body 32. Similarly, a second tab height 68 of the second tab 44 is at least 20 percent of the width 56 of the second body 42. The relatively large tab height provides room for welding the first tab 34 and the second tab 44 to bus structures and improves heat dissipation from the positive foil 30 and the negative foil 40.

As shown in FIG. 2C, the first mono cell 12, the second mono cell 14, and a plurality of additional cells may be stacked to form some, or all, of the battery module 10. Repeated units of the first mono cell 12 and the second mono cell 14 may be used to form the battery module 10, which may then be encased in a pouch structure or located with a plurality of other battery modules to form a battery pack. In FIG. 2C, the second mono cell 14 is in the foreground and the first mono cell 12 is in the background.

A positive bus, or bus bar, which may be referred to as a first bus 72, electrically connects the first tabs 34 of the positive foils 30. A negative bus, or bus bar, which may be referred to as a second bus 74, electrically connects the second tabs 44 of the negative foils 40. The first tabs 34 and the second tabs 44 may be welded together, and then welded to the first bus 72 and the second bus 74, respectively. Alternatively, the first tabs 34 and the second tabs 44 may be directly welded to the first bus 72 and the second bus 74, respectively. The first bus 72 and the second bus 74 provide connections for multiple electrodes to battery controllers and exterior circuits, such as loads, generators, or combinations thereof.

Figure 3:
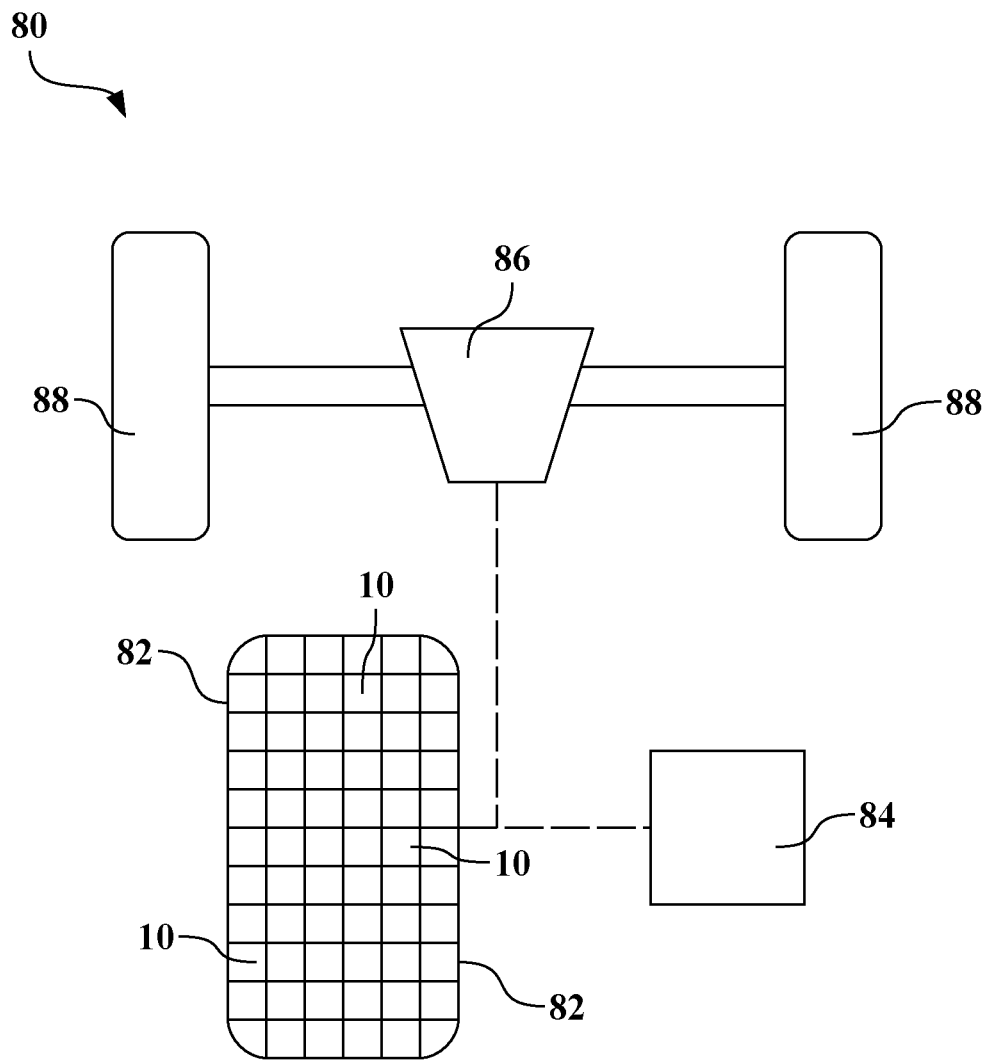
FIG. 3 is a schematic diagram of a powertrain having a battery pack formed from battery cells, such as those shown in FIGS. 1-2C.

Referring also to FIG. 3, and with continued reference to FIGS. 1-2C, there is schematically illustrated a powertrain 80, which may be incorporated into many types of vehicles, including those discussed herein. The powertrain 80 is highly schematic and would likely include numerous other components and elements.

A battery pack 82 is formed from multiple units of the battery modules 10, in various combinations of series and parallel connections, may be used within the powertrain 80. For example, and without limitation, the battery pack 82 may be used in an electric vehicle, a hybrid vehicle, or a plug-in hybrid vehicle. The battery pack 82 may be operatively connected, such as through a powertrain control module 84, to a motor and a generator, or to a combined motor/generator 86. Therefore, the battery pack 82 may receive and store electrical energy from either a grid or by conversion of kinetic energy in the motor/generator 86, or may output electrical energy to be converted to kinetic energy by the motor/generator 86. One or more traction devices 88 may be representative of, for example and without limitation: wheels or treads.

A battery pack 82 is formed from multiple units of the battery modules 10, in various combinations of series and parallel connections, can be utilized by lithium metal batteries (e.g., Li-S batteries) and lithium-ion batteries, and lend numerous advantageous to thereto, including improved (i.e., more uniform) current distribution allowing fast charge and discharge, increased thermal dissipation, reduced resistance, and reduced or eliminated lithium plating, among others. The shortest traveling distance of electron between the negative and positive terminals promotes the fast charge and discharge of lithium and lithium ion in the battery. In general, the ease with which lithium ions are reduced may create undesired lithium plating within lithium-based batteries.

Figure 4:
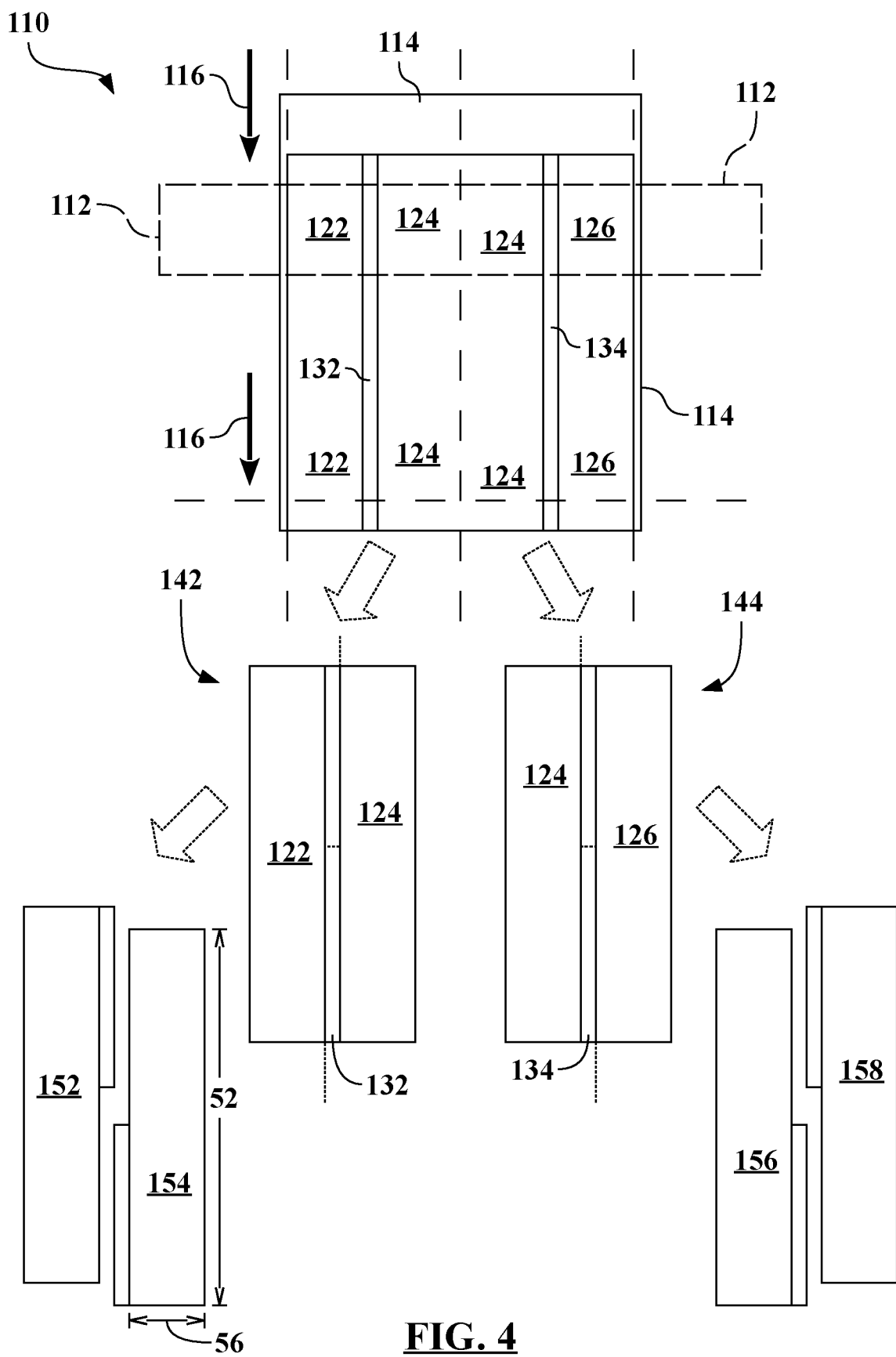
FIG. 4 is a schematic processing diagram illustrating one method and apparatus for producing electrodes, such as those shown in FIGS. 1-2C.

Referring also to FIG. 4, and with continued reference to FIGS. 1-3, there is schematically illustrated an apparatus 110 and method for forming battery electrodes, such as those shown in FIGS. 1-3. FIG. 4 is highly schematic, and portions thereof may not be illustrated at the same scale as other portions. The apparatus 110 includes a coating machine 112 and multiple trimming, cutting, or notching components. The cutting components are illustrated by cutting lines, but are not separately shown.

The apparatus 110, and methods of using the same, may be described relative to the positive electrode 22 and the negative electrode 24 shown and discussed in FIGS. 1-3. However, the apparatus 110 may be used to manufacture other structures and the positive electrode 22 and the negative electrode 24 may be manufactured via other means.

The apparatus 110 feeds a foil 114 through the coating machine 112. The foil 114 may be configured as a roll. As the foil 114 moves, the coating machine 112 deposits layers of coating onto the foil 114. Movement of the foil 114 defines a foil direction 116. The foil 114 may be formed from the base material for either the positive foil 30 or the negative foil 40.

The coating machine 112 applies at least a first coating band 122 and a second coating band 124 to the foil 114. The second coating band 124 is spaced from the first coating band 122 by a first foil gap or first tab gap 132, which is an uncoated portion of the foil 114.

The materials of the first coating band 122 and the second coating band 124 may be either the positive coating 36 or the negative coating 46. Additionally, the coatings may be built up, such that the coating machine 112 deposits multiple, thin, layers on the foil 114.

The apparatus 110 cuts the foil 114 substantially perpendicular to the foil direction 116. This separates a first coated blank 142 from the foil 114. The first coated blank 142 includes the first coating band 122, the second coating band 124—or a portion of the second coating band 124, as shown in FIG. 2—and the first tab gap 132. Additionally, edge-trimming operations may be cutting excess portions of the foil 114 as the coatings are applied, as shown in FIG. 4.

The first coated blank 142 may then be cut or notched, such as with a laser or a die cutting press. Notching the first coated blank 142 separates the first coating band 122 and a first portion of the first tab gap 132 from the second coating band 124 and a second portion of the first tab gap 132. At this point, a first electrode 152 is formed from the first coating band 122 and the first portion of the first tab gap 132, and a second electrode 154 is formed from the second coating band 124 and the second portion of the first tab gap 132.

The first electrode 152 and the second electrode 154 are substantially identical, and either may be or rotated into identical positions. Furthermore, if substantially the same coating is applied to both the front and back (as viewed relative to the orientation of FIGS. 2A and 2B) of the foil 114, then the first electrode 152 and the second electrode 154 may also be flipping without altering function. Therefore, both the first electrode 152 and the second electrode 154 may be, for example, the positive electrode 22 for either the first mono cell 12 or the second mono cell 14, because the location of the first tab 34 may be flipped to either the left side (first mono cell 12) or the right side (second mono cell 14).

The first electrode 152 and the second electrode 154 may be substantially similar to either the positive electrode 22 or the negative electrode 24 shown in FIGS. 1-3. A length of the first electrode 152 and the second electrode 154 is aligned with the foil direction 116, and may be substantially equal to the length 52 of the positive electrode 22 or the negative electrode 24. A width of the first electrode 152 and the second electrode 154 is substantially perpendicular to the foil direction 116, and may be substantially equal to the width 56 of the positive electrode 22 or the negative electrode 24. Therefore the first electrode 152 and the second electrode 154 also have a length-to-width ratio of at least five. Where the process of FIG. 4 is used to create the positive electrodes 22, a substantially similar process may be used to feed a second foil through the same or a different coating machine to deposit a negative coating and create the negative electrodes 24.

As shown in FIG. 4, the first portion and the second portion of the first tab gap 132 substantially equal the entire first tab gap 132. Therefore, the two resulting tabs, which are equivalent to the first tab 34 or the second tab 44 shown in FIGS. 1-3, formed on the first electrode 152 and the second electrode 154 are formed with little, or no, waste of the foil 114.

As shown in FIG. 4, the second coating band 124 is at least twice as wide as the first coating band 122. Therefore, additional electrodes may be formed from the same foil 114 moving in the same foil direction 116.

The coating machine 112 also applies a third coating band 126, which is spaced from the second coating band 124 by a second foil gap or second tab gap 134. The apparatus 110 cuts or slits the second coating band 124 substantially parallel to the foil direction 116. Sitting through the second coating band 124 separates the first coating band 122, the first tab gap 132, and a portion of the second coating band 124 into a first roll, and separates the third coating band 126, the second tab gap 134, and the remainder of the second coating band 124 into a second roll.

The second roll is cut substantially perpendicular to the foil direction 116 to separate a second coated blank 144. The second coated blank 144 is then notched to separate the third coating band 126 and a third portion of the second tab gap 134 from the remainder of the second coating band 124 and a fourth portion of the second tab gap 134.

The third portion and the fourth portion of the second tab gap 134 are substantially equal to the entire first tab gap 132. Therefore, a third electrode 156 is formed from the third coating band 126 and the third portion of the second tab gap 134, and a fourth electrode 158 is formed from the remainder of the second coating band 124 and the fourth portion of the second tab gap 134.

The apparatus 110 may be used to create multiple electrodes that have a length of nearly 600 millimeters, in spite of the fact that the operative width of the coating machine 112 may be less than 600 millimeters. By orienting the electrode length with the foil direction 116, the apparatus 110 is able to making electrodes having large length-to-width ratios. Additionally, by notching the first tab gap 132 and the second tab gap 134, the apparatus 110 is able to create electrodes with large tabs while significantly reducing, or nearly eliminating, the amount of waste from the foil 114.

The processes illustrated in FIG. 4 may be entirely linear, continuous, or both. Alternatively, there may be interruptions in the processes and the processes may split or spread onto different lines or paths. For example, after splitting the coated foil 114, the first and second foils may be recoiled and moved to separate machinery for separation of the first coated blank 142, the second coated blank 144, notching, or combinations thereof.

The detailed description and the drawings or figures are supportive and descriptive of the subject matter discussed herein. While some of the best modes and other embodiments have been described in detail, various alternative designs, embodiments, and configurations exist.

The invention claimed is:

1. A method of forming batteries, comprising:
feeding a first foil through a coating machine, wherein movement of the first foil defines a foil direction;
applying a first coating band to the first foil;
applying a second coating band to the first foil, wherein the second coating band is spaced from the first coating band by a first tab gap;
cutting the first foil substantially perpendicular to the foil direction to separate a first coated blank; and
cutting the first coated blank to:
separate the first coating band and a first portion of the first tab gap; and
separate the second coating band and a second portion of the first tab gap,
wherein a first electrode is formed from the first coating band and the first portion of the first tab gap, and a second electrode is formed from the second coating band and the second portion of the first tab gap,
wherein the first portion is at least 45 percent of the length of the first coating band, and the second portion is at least 45 percent of the length of the second coating band.

2. The method of claim 1,
wherein a length of the first electrode and the second electrode is aligned with the foil direction and a width of the first electrode and the second electrode is substantially perpendicular to the foil direction, and
wherein the length to width ratio of the first electrode and the second electrode is at least five.

3. The method of claim 2, wherein the first portion and the second portion of the first tab gap are substantially equal to the entire first tab gap.

4. The method of claim 3, wherein the second coating band is at least twice as wide as the first coating band, and further including:
applying a third coating band to the first foil, wherein the third coating band is spaced from the second coating band by a second tab gap;
cutting through the second coating band substantially parallel to the foil direction to separate the first coating band, the first tab gap, and a portion of the second coating band into a first roll, and the third coating band, the second tab gap, and the remainder of the second coating band into a second roll;
cutting the second roll substantially perpendicular to the foil direction to separate a second coated blank; and
cutting the second coated blank to:
separate the third coating band and a third portion of the second tab gap from the remainder of the second coating band and a fourth portion of the second tab gap,
wherein the third portion and the fourth portion of the second tab gap are substantially equal to the entire first tab gap,
such that a third electrode is formed from the third coating band and the third portion of the second tab gap, and a fourth electrode is formed from the remainder of the second coating band and the fourth portion of the second tab gap.

5. The method of claim 4, wherein the first foil is formed of one of aluminum alloy and copper alloy.

6. The method of claim 5, wherein the first coating band, the second coating band, and the third coating band are formed from the same material, which is one of an anodic material and a cathodic material.

7. The method of claim 6, further comprising:
feeding a second foil through the coating machine in the foil direction;
applying a fourth coating band to the second foil;
applying a fifth coating band to the second foil, wherein the fifth coating band is spaced from the fourth coating band by a third tab gap;
cutting the second foil substantially perpendicular to the foil direction to separate a third coated blank; and
cutting the third coated blank to:
separate the fourth coating band and a first portion of the third tab gap; and
separate the fifth coating band and a second portion of the third tab gap, wherein a fifth electrode is formed from the fourth coating band and the first portion of the third tab gap, and a sixth electrode is formed from the fifth coating band and the second portion of the third tab gap.

8. The method of claim 7, wherein the first foil is formed of aluminum alloy and the second foil is formed of copper alloy.

9. The method of claim 8, wherein the first coating band, the second coating band, and the third coating band are formed from the cathodic material, and the fourth coating band and the fifth coating band are formed from the anodic material.

10. A method of forming batteries, comprising:
feeding a first foil through a first coating machine, wherein movement of the first foil defines a foil direction;
applying a first coating band to the first foil;
applying a second coating band to the first foil, wherein the second coating band is spaced from the first coating band by a first tab gap;
cutting the first foil substantially perpendicular to the foil direction to separate a first coated blank;
cutting the first coated blank to:
separate the first coating band and a first portion of the first tab gap, to form a first electrode having a first tab; and
separate the second coating band and a second portion of the first tab gap, to form a second electrode having a second tab,
wherein a length of the first electrode and the second electrode is aligned with the foil direction and a width of the first electrode and the second electrode is substantially perpendicular to the foil direction, and wherein the length to width ratio of the first electrode and the second electrode is at least five;
feeding a second foil through a second coating machine, wherein movement of the second foil defines a foil direction;
applying a third coating band to the second foil;
applying a fourth coating band to the second foil, wherein the fourth coating band is spaced from the third coating band by a second tab gap;
cutting the second foil substantially perpendicular to the foil direction to separate a second coated blank;
cutting the second coated blank to:
separate the third coating band and a first portion of the second tab gap, to form a third electrode having a third tab; and
separate the fourth coating band and a second portion of the second tab gap, to form a fourth electrode having a fourth tab,
wherein a length of the third electrode and the fourth electrode is aligned with the foil direction and a width of the third electrode and the fourth electrode is substantially perpendicular to the foil direction, and wherein the length to width ratio of the third electrode and the fourth electrode is at least five; and
pairing the first electrode and the third electrode to form a first mono cell, wherein the first tab and the third tab are on opposite sides of the width of the first electrode and the third electrode.

11. The method of claim 10, further comprising:
pairing the second electrode and the fourth electrode to form a second mono cell, wherein the second tab and the fourth tab are on opposite sides of the width of the second electrode and the fourth electrode.

12. The method of claim 11, further comprising:
pairing the first mono cell and the second mono cell, wherein the first tab and the second tab are on opposite sides of the length of the first electrode and the second electrode and the third tab and the fourth tab are on opposite sides of the length of the third electrode and the fourth electrode.

13. The method of claim 12, wherein the first portion and the second portion of the first tab gap are at least ninety percent of the length of the first tab gap, and the first portion and the second portion of the second tab gap are at least ninety percent of the length of the second tab gap.

14. The method of claim 13, wherein:
the first foil is formed of aluminum alloy;
the second foil is formed of copper alloy;
the first coating band and the second coating band are formed of cathodic material; and
the third coating band and the fourth coating band are formed of anodic material.

15. The method of claim 10, wherein the first portion and the second portion of the first tab gap are at least ninety percent of the length of the first tab gap, and the first portion and the second portion of the second tab gap are at least ninety percent of the length of the second tab gap.

16. The method of claim 15, wherein:
the first foil is formed of aluminum alloy;
the second foil is formed of copper alloy;
the first coating band and the second coating band are formed of cathodic material; and
the third coating band and the fourth coating band are formed of anodic material.

* * * * *